(12) United States Patent
Hiraoka

(10) Patent No.: US 7,743,219 B2
(45) Date of Patent: Jun. 22, 2010

(54) INFORMATION PROCESSING UNIT, COMPUTER CONTROL METHOD, AND INFORMATION STORAGE MEDIUM

(75) Inventor: Daisuke Hiraoka, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 260 days.

(21) Appl. No.: 11/402,204

(22) Filed: Apr. 11, 2006

(65) Prior Publication Data
US 2007/0011689 A1 Jan. 11, 2007

(30) Foreign Application Priority Data
Apr. 11, 2005 (JP) ............... 2005-113577

(51) Int. Cl.
G06F 12/00 (2006.01)
G06F 13/00 (2006.01)
G06F 13/28 (2006.01)

(52) U.S. Cl. ............... 711/147; 711/154

(58) Field of Classification Search ............... 711/147
See application file for complete search history.

(56) References Cited

U.S. PATENT DOCUMENTS 5,691,920 A * 11/1997 Levine et al. ............... 702/186

6,691,182 B2 * 2/2004 Kagemoto ............... 710/28

OTHER PUBLICATIONS

Chandra Krintz and Brad Calder, "Reducing Delay With Dynamic Selection of Compression Formats", 10th IEEE International Symposium on High Performance Distributed Computing, Aug. 7-9, 2001, IEEE, pp. 266-277.*

* cited by examiner

*Primary Examiner*—Sheng-Jen Tsai
*Assistant Examiner*—Ralph A Verderamo, III
(74) *Attorney, Agent, or Firm*—Katten Muchin Rosenman LLP

(57) ABSTRACT

An information processing unit, a computer control method, and an information storage device are provided to acquire performance information during data processing and realize efficient data processing by changing data processing details as appropriate based on the information. An information processing unit includes: a data processing part 70 that processes data, an event detecting part 72 that detects predetermined events in the processing of the data processing part 70, a frequency information storage part 74 that stores frequency information the occurrence of the predetermined events detected by the event detecting part 72, a restriction judging part 76 that judges whether or not the processing of the data processing part 70 have been restricted based on the frequency information stored in the frequency information storage part 74, and a processing changing part 78 that changes details of the processing of the data processing part 70 when the restriction judging part 76 judges that the processing of the data processing part 70 have been restricted.

7 Claims, 7 Drawing Sheets

INFORMATION PROCESSING UNIT, COMPUTER CONTROL METHOD, AND INFORMATION STORAGE MEDIUM

BACKGROUND OF THE INVENTION

The present invention relates to an information processing unit, a computer control method, and an information storage medium, and in particular, to a technique to optimize data processing of the information processing unit.

When data processing is performed by an information processing unit based on programs, to improve the data processing efficiency, program optimization is frequently performed. This optimization is performed by collecting trace data in actual execution of the programs on the information processing unit, and analyzing the data.

However, with the above-described conventional technique, the trace data of the programs is collected, and based on the data, the programs must be manually modified. When the program execution environment is changed, for example, when the memory capacity and the types and numbers of programs to be simultaneously executed are changed, trace data must be collected and the programs must be modified again.

The invention was developed in view of the above-described problem, and an object thereof is to provide an information processing unit, a computer control method, and an information storage medium which can dynamically optimize program behavior.

SUMMARY OF THE INVENTION

To solve the problem, the information processing unit according to the invention includes: data processing means for processing data, including a plurality of processors; event detecting means for detecting a first event indicating that a specific processor among the plurality of processors has to wait to access a memory via a bus on the process by the data processing means and a second event indicating that the memory was accessed; frequency information storing means for storing information on frequencies of the occurrence of the first event and the second event detected by the event detecting means; restriction judging means for judging whether the process by the data processing means have been restricted due to data transfer between the specific processor and the memory based on frequency information of the first event and the second event stored in the frequency information storing means; and processing changing means for compressing data to be stored in the memory when the restriction judging means judges that the process by the data processing means have been restricted due to data transfer between the specific processor and the memory.

In addition, a control method for a computer according to the invention (for example, a home-use game machine, a business-use game machine, a cell phone, a portable game machine, a personal digital assistant, a personal computer, a server computer, or the like, hereinafter, the same applies) includes the steps of: data processing for processing data by a plurality of processors; event detecting for detecting a first event indicating that a specific processor among the plurality of processors has to wait to access a memory via a bus in the data processing step, and a second event indicating that the memory was accessed; restriction judging for judging whether the process by the data processing step have been restricted due to data transfer between the specific processor and the memory based on frequency information of the occurrence of the first event and the second event stored in frequency information storing means for storing frequency information of the first event and the second event detected by the event detecting step; and processing changing for compressing data to be stored in the memory when it is judged at the restriction judging step that the process by the data processing step have been restricted due to data transfer between the specific processor and the memory.

An information storage medium according to the invention stores programs for making a computer to function as: data processing means for processing data by a plurality of processors; event detecting means for detecting a first event indicating that a specific processor among the plurality of processors has to wait to access a memory via a bus on the process by the data processing means and a second event indicating that the memory was accessed;

frequency information storing means for storing information on frequencies of the occurrence of the first event and the second event detected by the event detecting means; restriction judging means for judging whether the process by the data processing means have been restricted due to data transfer between the specific processor and the memory based on frequency information of the first event and the second event stored in the frequency information storing means; and processing changing means for compressing data to be stored in the memory when the restriction judging means judges that the process by the data processing means have been restricted due to data transfer between the specific processor and the memory. It is also allowed that the programs are stored in a CD-ROM (Compact Disk—Read Only Memory), a DVD-ROM (Digital Versatile Disk—Read Only Memory), or any other computer readable information storage device.

According to the invention, in data processing, occurrence of the first event indicating that a specific processor of the plurality of processors has to wait to access a memory via a bus in the data processing and the second event indicating that the memory was accessed is detected. Then, frequency information of the occurrence of the first event and the second event is stored, and based on the stored frequency information, it is judged whether the data process by the processors have been restricted due to data transfer between the specific processor and the memory. When it is judged that the data process have been restricted, the data to be stored in the memory is compressed. Thus, according to the invention, data transfer efficiency in data processing is improved, when bottlenecks due to data transfer between a processor and a memory is generated, therefore program behavior can be dynamically optimized.

According to an embodiment of the invention, the restriction judging means judges that the process by the data processing means have been restricted due to data transfer between the specific processor and the memory based on the second event frequency of occurrence during a period of the first event occurring over a predetermined frequency. Thereby, based on frequency information of the first event and the second event, bus congestion due to data transfer between the processor and the memory can be highly reliably judged, and in this case, the processing efficiency can be improved by changing data processing details.

According to an embodiment of the invention, means for decompressing data compressed by the processing changing means is further included. Thereby, without changing the program side, the bottlenecks due to data transfer can be reduced by the information processing side and the data processing efficiency can be improved.

DETAILED DESCRIPTION OF THE PREFERRED EMBODIMENT

Hereinafter, a preferred embodiment of the invention will be explained in detail with reference to the drawings.

Figure 1:
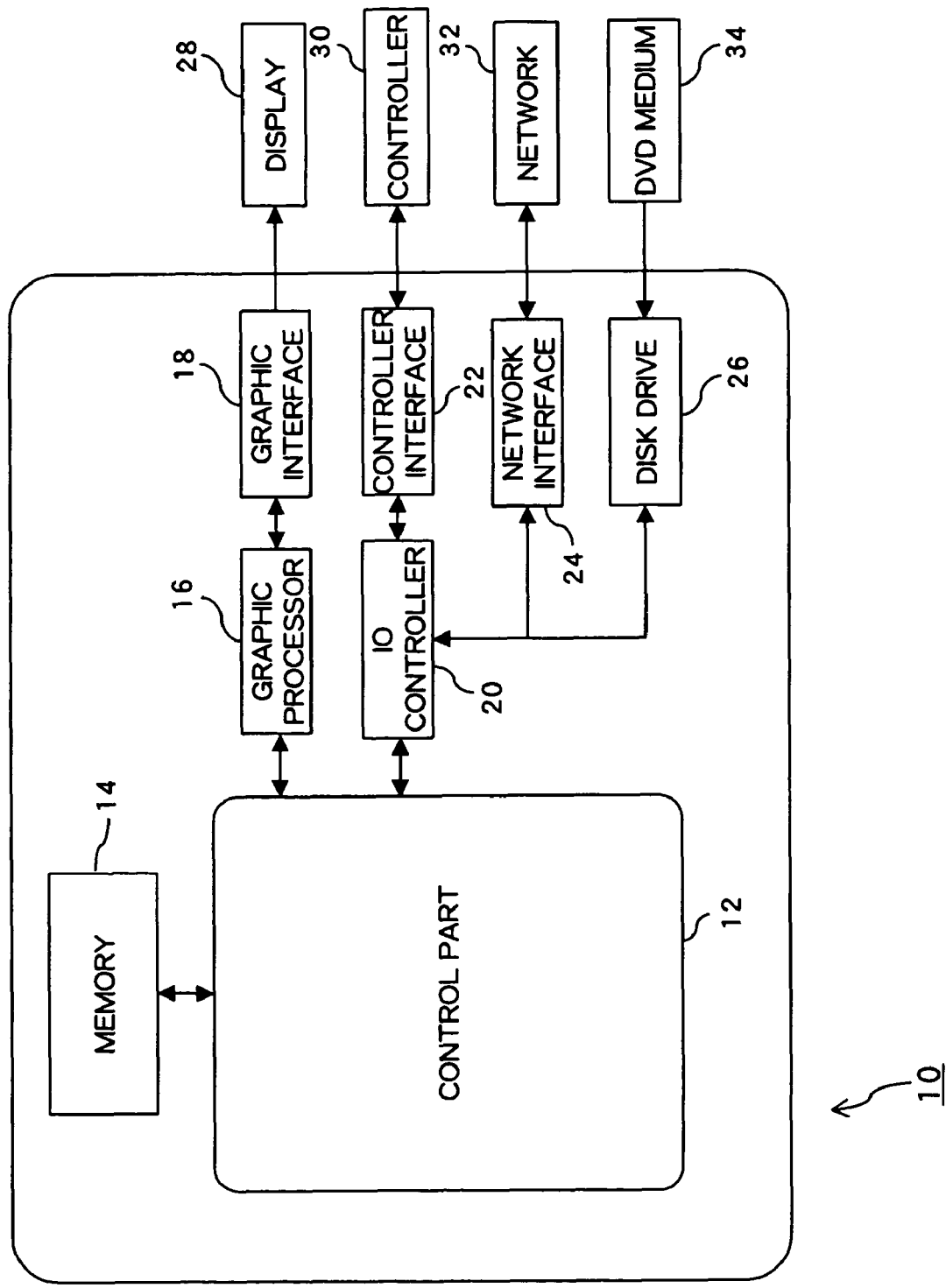
FIG. 1 is a hardware configuration diagram of the game machine according to the embodiment of the invention.

FIG. 1 is a hardware configuration diagram of a game machine according to an embodiment of the invention. As shown in this figure, the game machine 10 is a computer game system including a control part 12, a memory 14, a graphic processor 16, a graphic interface 18, an IO controller 20, a controller interface 22, a network interface 24, and a disk drive 26.

The control part 12 controls the respective parts of the game machine 10 based on an operating system stored in an unillustrated ROM and game programs read by the disk drive 26 from a DVD medium 34 that is a computer readable information storage medium. The memory 14 is also used for working space of the control part 12, on which game programs read from the DVD medium 34 and game data are written as appropriate.

The graphic processor 16 receives image data from the control part 12 and draws a game image screen on a VRAM (Video Random Access Memory). The graphic processor 16 outputs the details of the game image screen to the display 28 via the graphic interface 18.

The IO controller 20 is an input/output control part for connecting the control part 12 and an external device or the like. Via the IO controller 20, the control part 12 is connected to the controller 30 and the network interface 24 or the disk drive 26 in a manner enabling these to communicate with each other. The controller 30 is input means that enables a player to perform game operations and data processing instruction, and is connected to the IO controller 20 via the controller interface 22. The game machine 10 is connected to the network 32 via the network interface 24, and makes interactive communications with external information equipment. The game machine 10 reads data and programs from a DVD medium 34 loaded in the disk drive 26.

Figure 2:
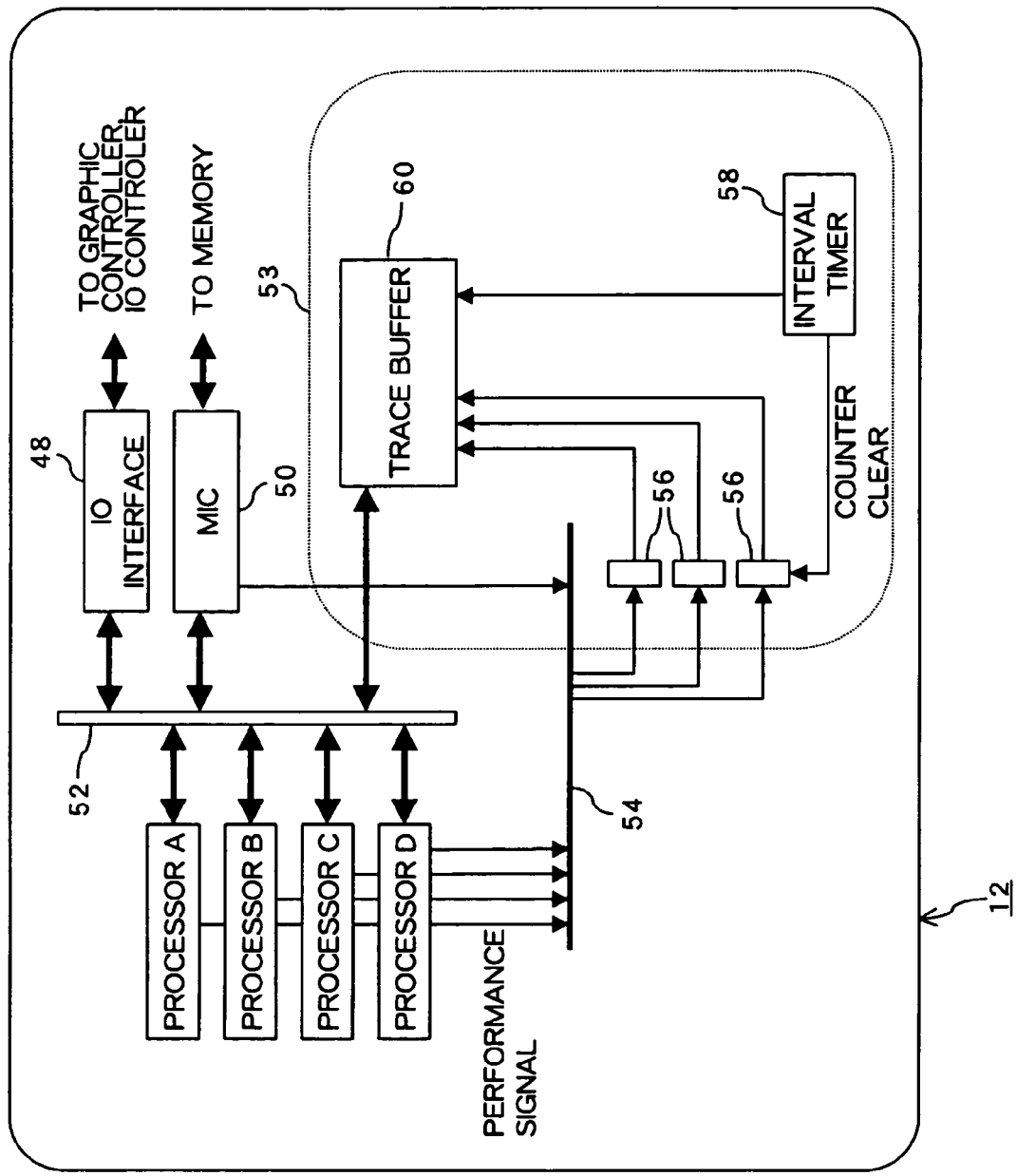
FIG. 2 is a detailed hardware configuration diagram of the control part 12.

FIG. 2 is a detailed hardware configuration diagram of the control part 12. As shown in this figure, the control part 12 includes a processor A, a processor B, a processor C, a processor D, an IO interface (hereinafter, referred to as IO IF) 48, a memory interface controller (hereinafter, referred to as MIC) 50, an internal bus 52, and a performance monitor 53. The performance monitor 53 is composed of a trace bus 54, a performance counter 56, an interval timer 58, and a trace buffer 60, which acquires data processing performance information of the game machine 10.

The processors A through D are signal processors independent from each other. In this embodiment, the processors A through D have the same configurations, however, it is allowed that they have different configurations from each other. The hardware configurations of the processors A through D will be explained below.

Figure 3:
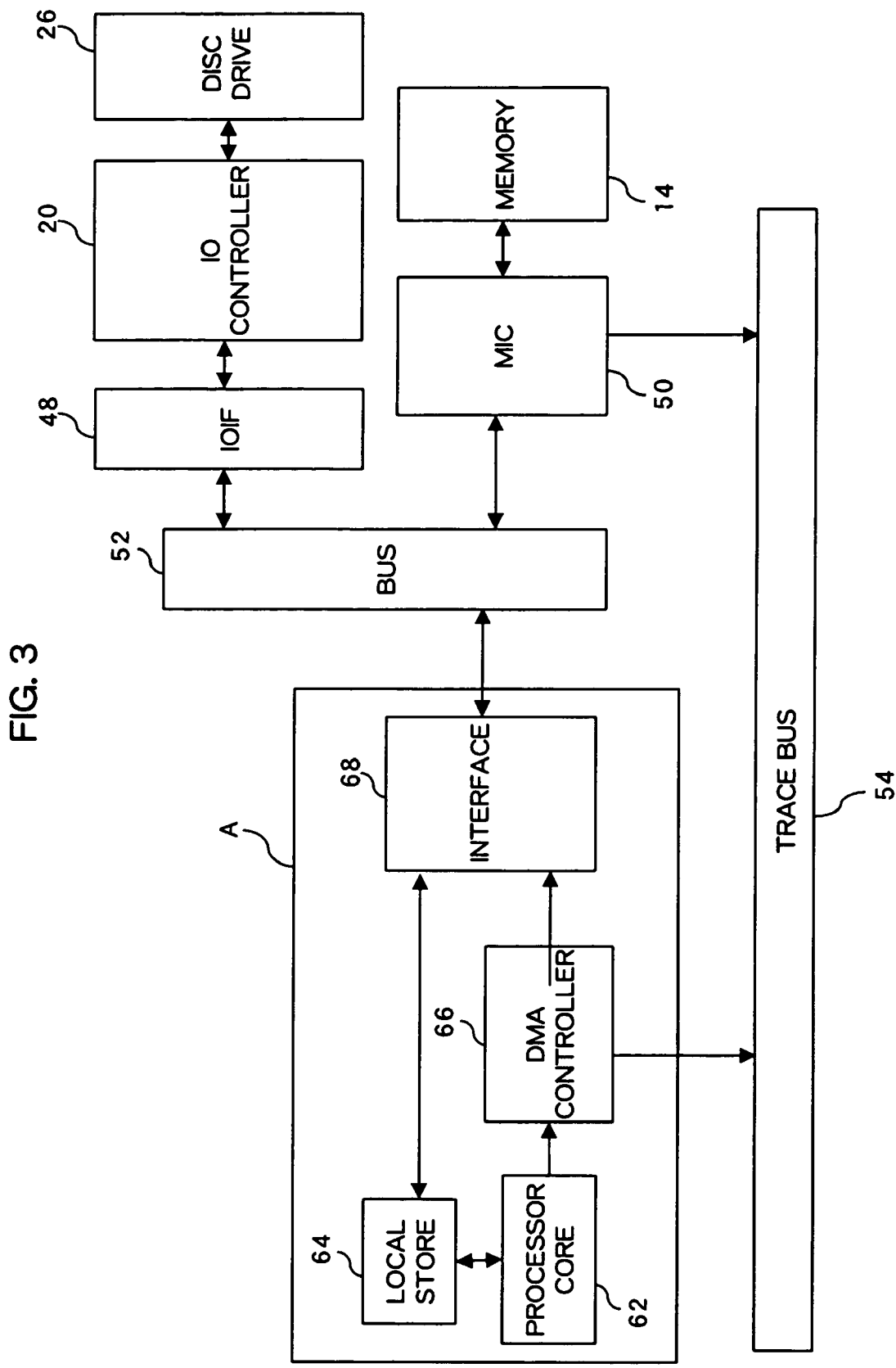
FIG. 3 is a block diagram of a part of the game machine 10.

The processor A includes, as shown in FIG. 3, a processor core 62, a local store 64, a DMA controller 66, and an interface 68. The processor core 62 is a part that performs actual arithmetic processing of data. The local store 64 is a RAM exclusive for the processor A. The local store 64 temporarily stores programs and data copied from the memory 14. The processor A performs data transfer between the local store 64 and the memory 14 by using the DMA controller 66. In a queue of the DMA controller 66, a plurality of DMA transfer requests are stored. In the DMA controller 66, when the transfer request queue is full, a queue full signal is transmitted to the trace bus 54, and when the queue is not full but some requests remain, a queue-not-empty signal is transmitted to the trace bus 54. The processor A is connected to the bus 52 via the interface 68 to transmit and receive signals to and from the respective parts of the game machine 10. Other processors B through D also have the same configuration as that of the processor A.

The IO IF 48 is an input/output interface for connecting the control part 12, the graphic processor 16, and the IO controller 20 in a manner enabling them to communicate with each other. The IO IF 48 is connected to the internal bus 52. Via the IO IF 48, the respective parts of the control part 12 and an external device can transmit and receive signals to and from each other.

The MIC 50 is a memory interface controller for accessing the memory 14. The peripheral devices including the control part 12 and the IO controller 20 access the memory 14 via the MIC 50. When data is read from or written on the memory 14, a reading access (Read dispatched) signal or a writing access (Write dispatched) signal is generated at the MIC 50 and transmitted to the trace bus 54.

The trace bus 54 is a bus to which a performance signal outputted from the hardware module of the control part 12 is transmitted. In this embodiment, to the trace bus 54, performance signals from at least the processors A through D and the MIC are transmitted, however, signals from other modules are allowed to be transmitted.

The performance counter 56 counts the number of generation of a predetermined signal among signals passing via the trace bus 54. In this embodiment, the number of performance signal generations from the processors A through D and the MIC is counted, however, without limiting to this, it is also possible that a user freely sets signals to be counted. Then, based on counter clear signals transmitted at predetermined time intervals by the interval timer 58, the count of the counter is initialized.

The trace buffer 60 is a storage part that stores generation frequency information of predetermined signals counted at predetermined time intervals by the performance counter 56. Based on counter clear signals transmitted at predetermined time intervals by the interval timer 58, the numbers of the respective performance signals counted by the performance counter 56, that is, generation frequency information of predetermined signals are written on the trace buffer 60. The trace buffer 60 is also connected to the internal bus 52. The processors A through D can refer to the stored contents of the trace buffer 60 via the internal bus 52.

FIG. 3 is a block diagram of a part of the game machine 10. In this figure, the processor A, the disk drive 26, and the memory 14 of the game machine 10 are mainly shown. Data processing performed by the processor A by using data stored in the DVD medium 34 (see FIG. 1) will be explained hereinafter. Other processors B through D also perform data processing in a manner similar to that of the processor A.

In the case to be explained hereinafter, the processor A performs data processing by setting the local store 64 to a double buffer configuration. The double buffer configuration is a configuration in that the processor A reads, during arithmetic operation using one buffer, data to be processed by the next arithmetic operation from the memory 14, and shifts to the next arithmetic operation immediately after the arithmetic operation is finished. In the double buffer configuration, when data transfer between the memory 14 and the processor A is delayed by congestion in the internal bus 52, the next arithmetic operation is not started immediately, resulting in inefficiency. In this embodiment, when it is judged that the internal bus 52 is busy due to data transfer between the memory 14 and the processor A, the data to be stored in the memory 14 is compressed to reduce the data amount to be transferred via the internal bus 52, whereby improving the processing efficiency. The detailed flow of the processing will be explained hereinafter.

Figure 4:
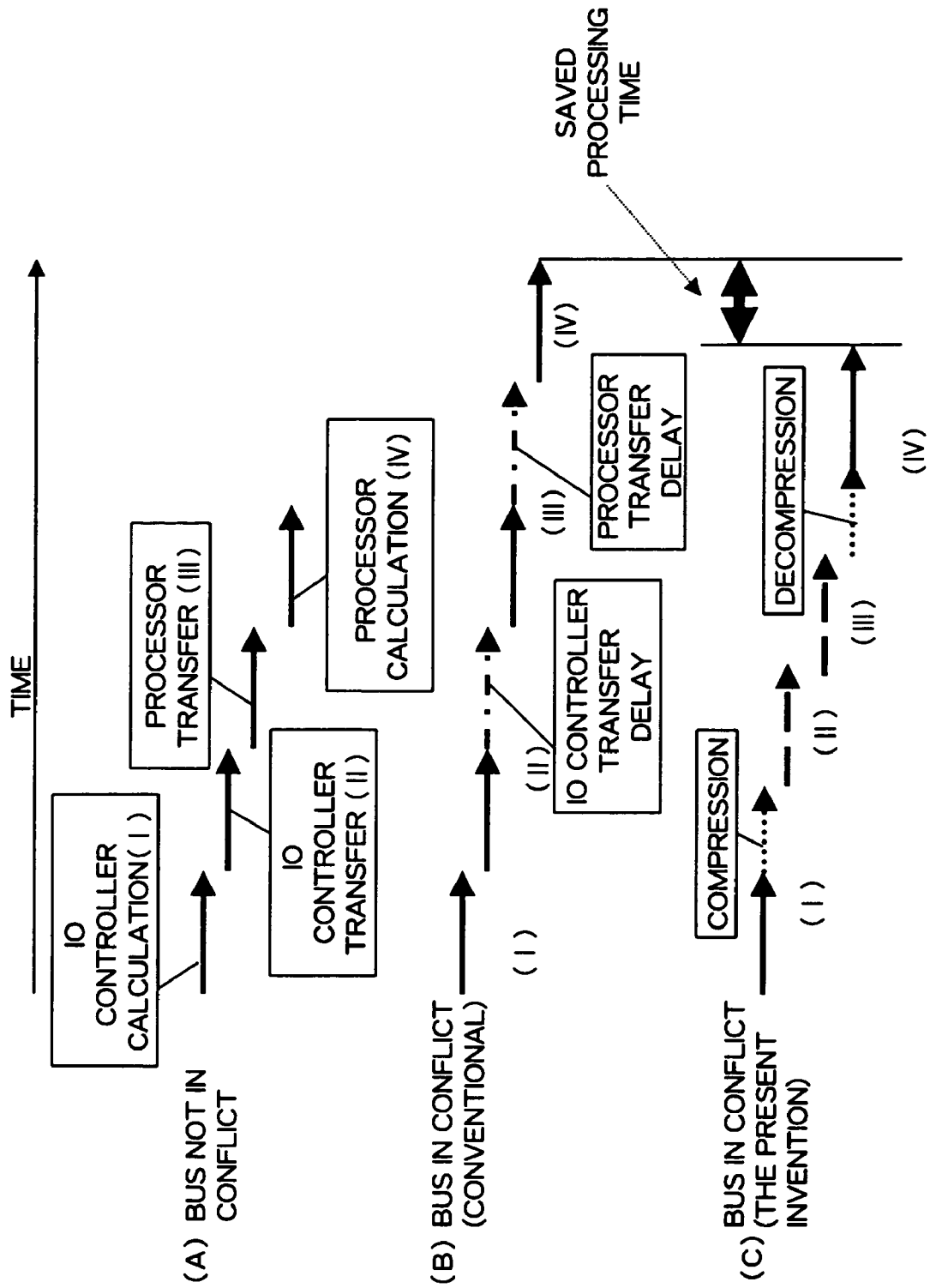
FIG. 4 is an explanatory view of data processing change by the game machine in response to the data processing being restricted.

The processor A outputs a request to read $N+1^{th}$ processing target data to the DMA controller 66 during $N^{th}$ data processing. It is assumed that the processing target data is stored in the DVD medium 34 loaded in the disk drive 26. The IO controller 20 receives the data transfer request from the DMA controller 66, and then it reads the target data from the disk drive 26 that has loaded the DVD medium 34. As shown in FIG. 4A, when there is no conflict between the memory 14 and the processor A in transmitting data through the internal bus 52, the data read by the IO controller 20 (step I) is transferred (step II) without change (without being subjected to compression as described later), and stored in the memory 14. Then, in the processor A, the DMA controller 66 that has received a signal indicating that the data transfer from the IO controller 20 to the memory 14 has been finished reads this data from the memory 14 and transfers it to the local store 64 (step III), and the $N+1^{th}$ data processing is started (step IV). When there is a conflict between the memory 14 and the processor A in transmitting data through the bus 52, as shown in FIG. 4B, processing (steps II and III) relating to the data transfer is delayed. Therefore, the game machine 10 according to this embodiment compresses the data to be stored in the memory 14 and reduces the data amount to shorten the total processing time when there is a conflict in transmitting data through the bus 52 as shown in FIG. 4C. Then, the game machine 10 of this embodiment judges switching of the processing based on information stored in the trace buffer 60 of the performance monitor 53. Thereby, the game machine 10 can perform data compression as described above according to the actual performance of the control part 12.

Figure 5:
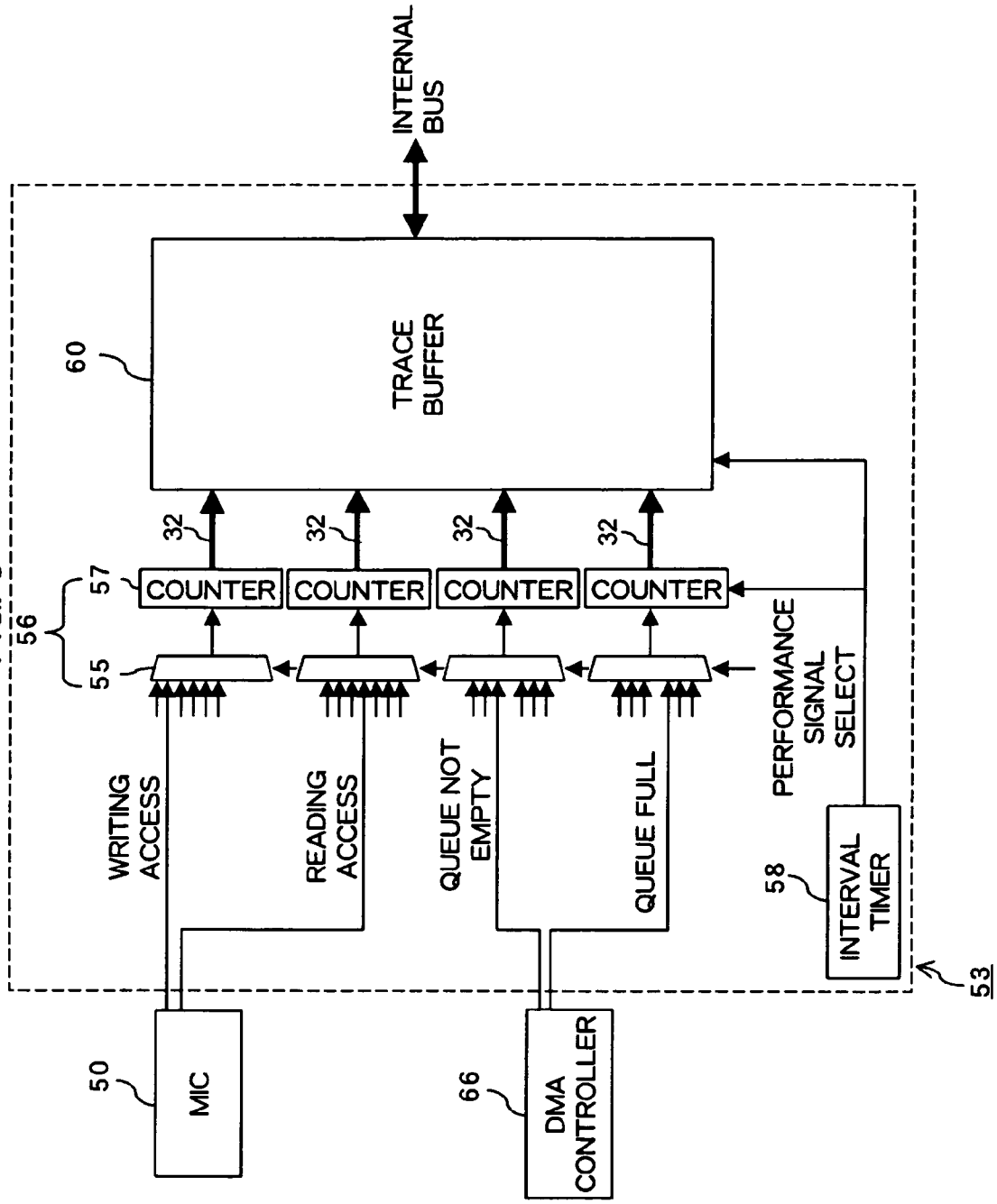
FIG. 5 is a block diagram of the performance monitor 53.

FIG. 5 is a block diagram of the performance monitor 53. As shown in this figure, the performance monitor 53 includes a performance counter 56, an interval timer 58, and a trace buffer 60. The performance counter 56 is composed of a selector 55 and a counter 57.

In the performance monitor 53, only signals indicating reading access (Read Dispatched) and writing access (Write Dispatched) from the MIC 50 and queue full and queue-not-empty signals from the DMA controller 66 are selected by the selector 55 and the numbers of generations of the signals are counted by the counter 57. In response to signals transmitted at predetermined time intervals from the interval timer 58, the numbers of storing of the signals in the counter 57 are written on the trace buffer 60. Thereafter, the counter 57 is cleared. In this embodiment, the counter 57 is a 32-bit counter, and in the trace buffer, data is successively stored with 128 bits of frequency information of the four signals as one string at predetermined time intervals, however, without limiting to this, it is also possible that the signals to be acquired and the size of the counter 57 are freely set by a user.

Figure 6:
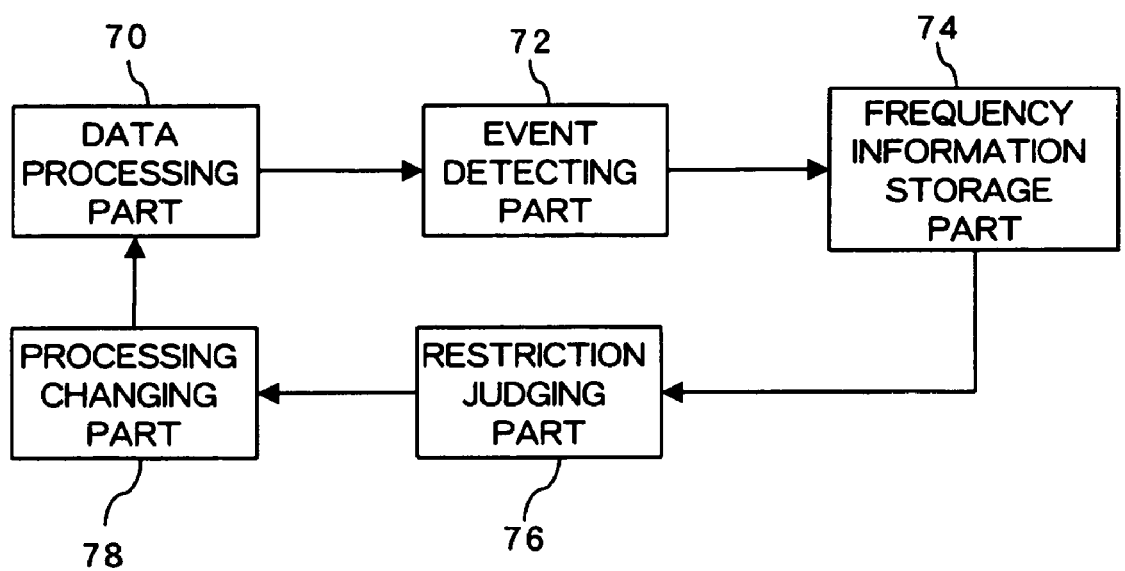
FIG. 6 is a functional block diagram of the game machine 10.

FIG. 6 is a functional block diagram of the game machine 10. As shown in this figure, the game machine 10 includes a data processing part 70, an event detecting part 72, a frequency information storage part 74, a restriction judging part 76, and a processing changing part 78.

The processing part 70 processes data, which is composed of processors A through D and the MIC 50 of the control part 12. The processors A through D transfer data from the memory 14 that they share to their own local stores 64, and process the data. The MIC 50 relays the accesses from the processors A through D to the memory 14.

The event detecting part 72 detects that predetermined events occur in the processing of the data processing part 70, which includes DMA controller 66, MIC 50, and a selector 55. The events to be detected by the event detecting part 72 are the first event indicating that a specific processor (herein, the processor A) among the plurality of processors has to wait to access the memory 14 via the bus 52, and the second event indicating that the memory 14 was accessed. The first event is detected based on a queue full signal from the DMA controller 66 of the specific processor. The second event is detected based on a signal indicating occurrence of memory access (reading access (Read Dispatched) and writing access (Write Dispatched)) signals in the MIC 50.

The frequency information storage part 74 stores frequency information of the occurrence of the predetermined events detected by the event detecting part 72, which includes a trace buffer 60. The frequency information of the predetermined events is, in detail, the numbers of counts of the first event and the second event detected by the event detecting part 72 at time intervals divided by the interval timer 58, counted by the counter 57. This frequency information is successively written on the trace buffer 60 at each time interval divided by the interval timer 58.

The restriction judging part 76 judges whether the process by the data processing part 70 have been restricted based on the frequency information stored in the frequency information storage part 74. The restriction judging part 76 is composed of, for example, the processor A. In this embodiment, the restriction judging part 76 judges that the process by the data processing part 70 have been restricted due to data transfer between the processor A and the memory 14. When the memory 14 is frequently accessed while the queue of the DMA controller 66 of the processor is gradually filled, it is presumed that the processing delay is caused by congestion of the internal bus 52. Therefore, the processor core 62 reads the frequency information of the first event and the second event from the trace buffer 60, and based on the information, judges whether the data processing have been restricted due to the data transfer. For example, at the time intervals divided by the interval timer 58, in a period with the frequency of the first event continuously (for example, a predetermined time or more) exceeding a predetermined threshold, occurrence of the restriction in data processing is judged depending on whether the frequency of the second event exceeds a predetermined frequency. As described above, by using the frequency information stored in the trace buffer 60 that the processor core 62 can quickly access for performance analysis of the data processing being executed, without interruption by another program for performance analysis, performance information of data processing in the program being executed can be grasped in real time. The restriction judging part 76 is allowed to be composed of the processor core 62 of the processor A or the process core 62 of another processor that can access the trace buffer 60.

The processing changing part 78 changes the details of processing of the data processing part 70 when the restriction judging part 76 judges that the process by the data processing part 70 have been restricted. The processing changing part 78 is composed of, for example, the processor A or the IO controller 20. In this embodiment, when the restriction judging part 76 judges that the process by the data processing part 70 have been restricted due to data transfer between the processor A and the memory 14, the data to be stored in the memory 14 is compressed, however, the invention is not limited to this. The data processing part 70 transfers the compressed data to its own local store 64 and decompresses it, and then processes the data.

Detailed processing when the restriction judging part 76 and the processing changing part 78 are composed of the processor A will be described hereinafter. The processor A refers to the contents of the trace buffer 60 via the internal bus 52. In a period of the frequency of the first event continuously (for example, a predetermined time or more) exceeding a predetermined threshold at the time intervals divided by the interval timer 58, if the frequency of the second event exceeds a predetermined frequency, the processor A judges that the data transfer have been restricted due to congestion of the bus between the processor A and the memory 14. Then, the processor A sets a flag indicating a compression mode in a shared memory space in the memory 14. The flag indicating the compression mode is referred to by the processors A through D and the IO controller 20. It is also allowed that the respective processors and IO controller 20 periodically refer to the shared memory space and store the latest flag value in their own exclusive storage parts (local stores or the like). When the flag of the compression mode is set, the processors and the IO controller 20 compress the data and store it in the memory 14, and they decompress the data they receive from the memory 14. Program processing of the processor A upon reading data stored in the DVD medium 34 will be explained hereinafter. The IO controller 20 requested by the processor A to perform data transfer compresses the data read from the DVD medium 34 loaded in the disk drive 26 and writes it on the memory 14 when the flag of the compression mode is set. Then, when writing is finished, the IO controller 20 notifies the DMA controller 66 of the data storing position and the data size. The DMA controller 66 reads this data from the memory 14 and stores it in the local store 64. Then, the processor A judges that data transfer is being performed in the present compression mode by referring to the flag of the compression mode, and after decompressing the data, processes the program by using the decompressed data. It is also possible that these functions are installed in the data transfer programs used by the processor A and the IO controller 20. Namely, the data transfer program can be implemented so that, in the data transfer program, the flag of the compression mode is referred to before execution of the data transfer, and when the flag of the compression mode is set, the data is compressed and stored in the memory 14, and when receiving the data from the memory 14, the data is decompressed after being received. In the above-described example, the processor A sets the flag of the compression mode, however, another processor B through D may judge the occurrence of the restriction in data processing and sets the flag.

Hereinafter, details of operations of an image processing unit according to an embodiment of the invention will be explained.

Figure 7:
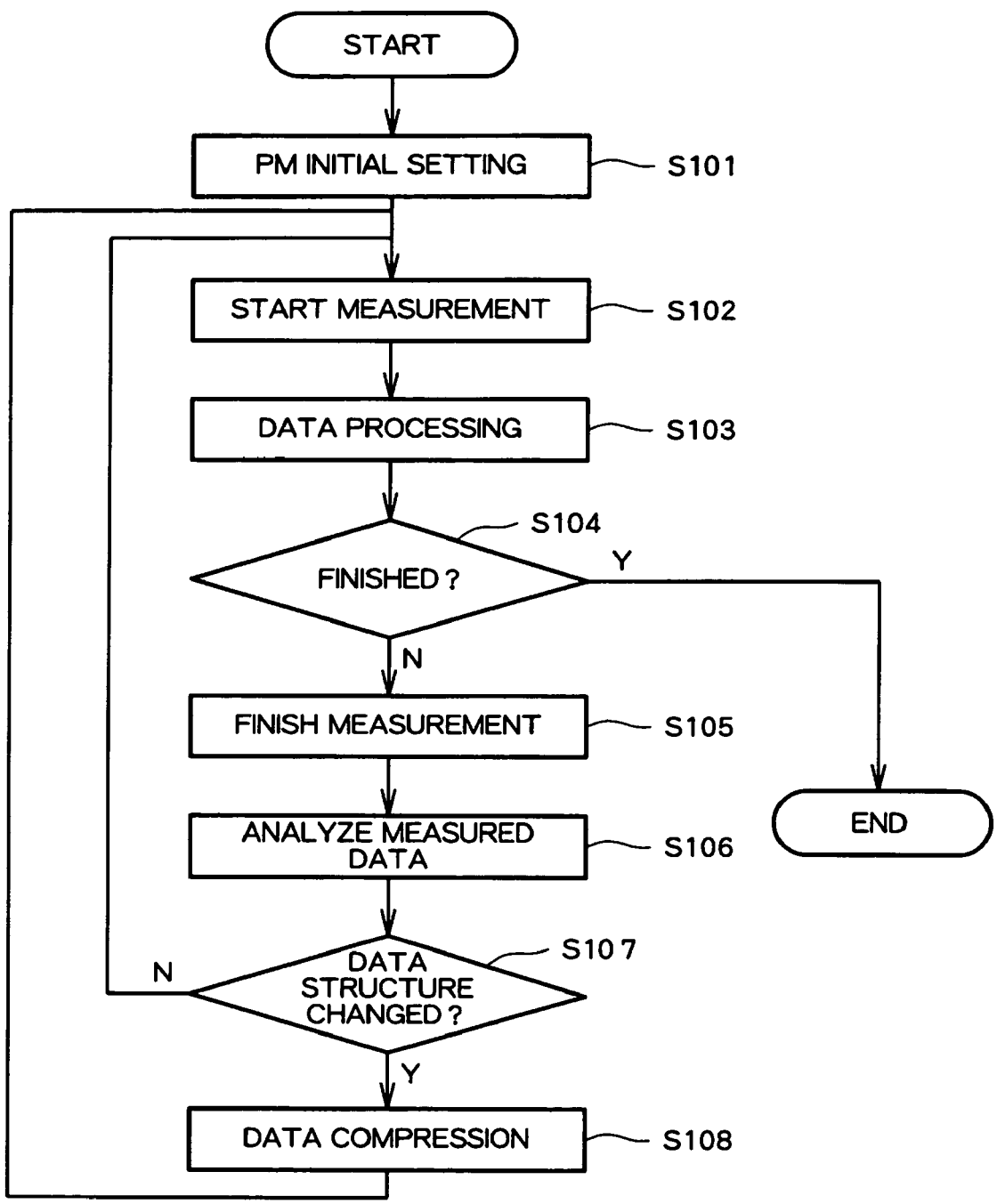
FIG. 7 is a flowchart of data structure changing processing of the game machine 10.

FIG. 7 is a flowchart of data structure changing processing during data processing of the game machine 10. The game machine 10 performs initial setting of the performance monitor 53 (S101) In initial setting, signals to be detected as performance signals, a frequency threshold for judging that the data processing have been restricted, and an output time interval of an initialization signal from the interval timer 58 to the counter 56 are set. The game machine 10 starts performance measurements (S102), and performs data processing based on a program such as a game program supplied from the DVD medium 34 (S103). When the game machine 10 judges that the data processing will be finished before a predetermined time elapses (S104), it finishes the processing. When the game machine 10 judges that the data processing will not be finished before the predetermined time elapses, it finishes the measurement after the predetermined time elapses (S105) . Then, the game machine 10 analyzes performance information on the processing of the game machine 10 from the measured frequency information of the first event and the second event (S106), and judges whether the data processing have been restricted due to data transfer between the processor A and the memory 14, that is, whether the data structure needs to be changed (S107). When the game machine 10 judges that the data processing have been restricted, it compresses the data (S108) and writes it on the memory 14. In this case, the processor A of the game machine 10 processes the data upon decompressing the data after transferring the compressed data.

According to the game machine 10 of the embodiment of the invention described above, by using predetermined event frequency information stored in the trace buffer 60 for performance analysis of data processing being executed, performance information in the data processing being executed can be grasped in real time without interruption by software for performance analysis, and data processing can be efficiently performed by changing the data processing details as appropriate based on the information.

The invention is not limited to the above-described embodiment.

In the above-described embodiment, when it is judged that the data processing have been restricted, the game machine 10 compresses all data, however, all data is not necessarily compressed. For example, based on the information stored in the trace buffer, the ratio of the data to be compressed by the game machine 10 can be determined.

In addition, in the above-described embodiment, the game machine 10 judges whether the data processing have been restricted by using signals transmitted from the processors and the MIC, however, it is also allowed that the judgement as to whether the data processing have been restricted is made by using signals transmitted from another hardware module.

In addition, in the above-described embodiment, when the data processing have been restricted due to data transfer between the processor and the memory, the data processing details are changed, however, restrictions are not limited to this. For example, the restrictions may be various restrictions to be generated on data processing of an information processing unit such as memory access competition, interrupt competition, and deadlock.

In addition, in the above-described embodiment, the number of processors is four, however, the number of processors is not limited to this.

What is claimed is:

1. An information processing unit comprising:
   data processing means for processing data, including a plurality of processors;

queue storing means included in each of the plurality of processors for storing a request queue of accessing a memory shared by the plurality of processors;

event detecting means for detecting a first event indicating that the request queue stored in the queue storing means included in a processor among the plurality of processors is full on the process by the data processing means and a second event indicating that the memory is accessed;

frequency information storing means for storing information on frequencies of the occurrence of the first event and the second event detected by the event detecting means in each predetermined time interval;

restriction judging means for judging that the process by the data processing means have been restricted due to data transfer between the processor and the memory when the second event has been occurring over a predetermined frequency during a period of the first event occurring over a predetermined frequency; and processing changing means for compressing data to be stored in the memory when the restriction judging means judges that the process by the data processing means have been restricted due to data transfer between the processor and the memory.

2. The information processing unit according to claim 1, wherein the restriction judging means judges that the process by the data processing means have been restricted due to data transfer between the processor and the memory based on a frequency of the second event during a period of the first event occurring over a predetermined frequency.

3. The information processing unit according to claim 1, further comprising:

means for decompressing data compressed by the processing changing means.

4. A computer control method comprising the steps of:

data processing for processing data by a plurality of processors;

queue storing for storing a request queue of accessing a memory shared by the plurality of processors in a queue storing means included in each of the plurality of processors;

event detecting for detecting a first event indicating that the request queue stored in the queue storing means included in a processor among the plurality of processors is full in the data processing step, and a second event indicating that the memory is accessed;

restriction judging for judging that the process by the data processing step have been restricted due to data transfer between the processor and the memory when the second event has been occurring over a predetermined frequency during a period of the first event occurring over a predetermined frequency; and processing changing for compressing data to be stored in the memory when it is judged at the restriction judging step that the process by the data processing step have been restricted due to data transfer between the processor and the memory.

5. An information storage medium that stores programs for making a computer to function as:

data processing means for processing data, including a plurality of processors;

queue storing means included in each of the plurality of processors for storing a request queue of accessing a memory shared by the plurality of processors;

event detecting means for detecting a first event indicating that the request queue stored in the queue storing means included in a processor among the plurality of processors is full on the process by the data processing means and a second event indicating that the memory is accessed;

frequency information storing means for storing information on frequencies of the occurrence of the first event and the second event detected by the event detecting means in each predetermined time interval;

restriction judging means for judging that the process by the data processing means have been restricted due to data transfer between the processor and the memory when the second event has been occurring over a predetermined frequency during a period of the first event occurring over a predetermined frequency; and processing changing means for compressing data to be stored in the memory when the restriction judging means judges that the process by the data processing means have been restricted due to data transfer between the processor and the memory.

6. The information processing unit according to claim 1, wherein the request queue is a request queue of transferring data between the processor and the memory.

7. An information processing unit comprising:

a plurality of processors;

DMA controllers included in each of the plurality of processors for storing a request queue of accessing a memory shared by the plurality of processors;

a buffer for storing information on frequencies of the occurrence of a first event indicating that a request queue stored in a DMA controller included in a processor among the plurality of processors is full on the process by the data processing means, and a second event indicating that the memory is accessed; wherein at least one of the plurality of processors judges whether the process by the processors has been restricted due to data transfer between the processor and the memory when the second event has been occurring over a predetermined frequency during a period of the first event occurring over a predetermined frequency, and compresses data to be stored in the memory when the restriction is judged during the process by the processors to have been restricted due to data transfer between the processor and the memory.

* * * * *